United States Patent
Cionca et al.

(10) Patent No.: US 11,035,679 B2
(45) Date of Patent: Jun. 15, 2021

(54) LOCALIZATION TECHNIQUE

(71) Applicant: Ford Global Technologies, LLC, Dearborn, MI (US)

(72) Inventors: Codrin Cionca, Ann Arbor, MI (US); Juan Enrique Castorena Martinez, Southfield, MI (US); Mostafa Parchami, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 259 days.

(21) Appl. No.: 16/239,952

(22) Filed: Jan. 4, 2019

(65) Prior Publication Data

US 2020/0217668 A1 Jul. 9, 2020

(51) Int. Cl.
*G01C 21/32* (2006.01)
*G06F 16/29* (2019.01)
*G06T 7/70* (2017.01)

(52) U.S. Cl.
CPC ............ *G01C 21/32* (2013.01); *G06F 16/29* (2019.01); *G06T 7/70* (2017.01); *G06T 2207/30244* (2013.01); *G06T 2207/30252* (2013.01)

(58) Field of Classification Search
CPC . G01C 21/32; G06T 7/70; G06T 2207/30244; G06T 2207/30252; G06F 16/29
See application file for complete search history.

(56) References Cited

U.S. PATENT DOCUMENTS

| | | |
|---|---|---|
| 9,207,086 B2 | 12/2015 | Kim |
| 9,702,964 B2 | 7/2017 | Stahlin et al. |
| 2008/0189003 A1* | 8/2008 | Gillula .................. G05D 1/028 701/24 |
| 2012/0185112 A1* | 7/2012 | Sung ................ G08G 1/096741 701/1 |
| 2018/0005407 A1* | 1/2018 | Browning ............ G05D 1/0212 |
| 2019/0033466 A1* | 1/2019 | Palella .................... G01P 15/18 |
| 2019/0079526 A1* | 3/2019 | Vallespi-Gonzalez ..................... G01S 17/931 |
| 2019/0316914 A1* | 10/2019 | Shin ........................ G01C 21/30 |

FOREIGN PATENT DOCUMENTS

| | | |
|---|---|---|
| DE | 102009041586 B4 | 6/2017 |
| WO | 2015113676 A1 | 8/2015 |
| WO | 2018007275 A1 | 1/2018 |

OTHER PUBLICATIONS

Khattab et al., "High Accuracy GPS-Free Vehicle Localization Framework via an INS-Assisted Single RSU", International Journal of Distributed Sensor Networks, vol. 2015, Article ID 795036, https://journals.sagepub.com/doi/10.1155/2015/795036.

(Continued)

*Primary Examiner* — Jeff A Burke
*Assistant Examiner* — Mohamed O El Sayah
(74) *Attorney, Agent, or Firm* — Frank A. MacKenzie; Bejin Bieneman PLC

(57) ABSTRACT

A computer includes a processor and a memory. The memory stores instructions executable by the processor to receive, in a vehicle, object data from an external node, and upon identifying a point, in the received object data, that is within a volume defined based on vehicle position data received from a vehicle sensor, to determine an adjusted vehicle position based on the identified point and the vehicle position data.

20 Claims, 4 Drawing Sheets

(56) References Cited

OTHER PUBLICATIONS

Santos et al., "A Roadside Unit-Based Localization Scheme to Improve Positioning for Vehicular Networks", 2016 IEEE: 84th Vehicular Technology Conference (VTC-Fall), Sep. 18-21, 2016, https://ieeexplore.ieee.org/document/7880873.

Zhang et al., "Vehicle-infrastructure localization based on the SME filter", 2015 IEEE 18th International Conference on Intelligent Transportation Systems.

* cited by examiner

LOCALIZATION TECHNIQUE

BACKGROUND

A vehicle such as an autonomous or semi-autonomous vehicle can use data from a location sensor, e.g., GPS (Global Positioning System), to aid navigation. An autonomous vehicle may compare its substantially real-time location data to a map of an area in which the vehicle is operating to locate the vehicle within the area and navigate the vehicle based on the determined vehicle location. The location data may have inaccuracies that can make it difficult to navigate the vehicle.

DETAILED DESCRIPTION

Introduction

Figure 1A:
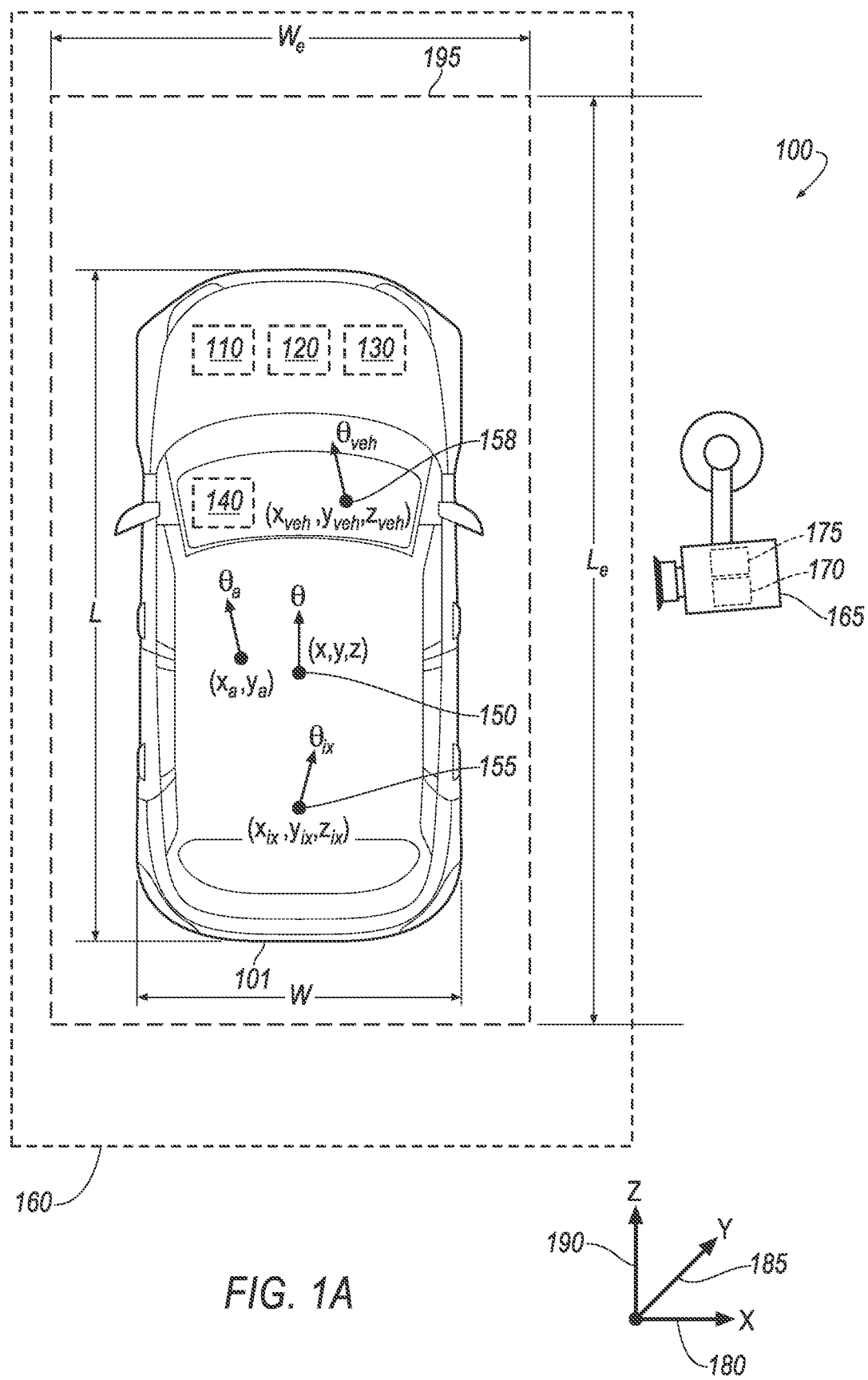
FIG. 1A is a block diagram showing an example sensor directed toward an example road section.

Disclosed herein is a computer comprising a processor and a memory. The memory stores instructions executable by the processor to receive, in a vehicle, object data from an external node, and upon identifying a point, in the received object data, that is within a volume defined using vehicle position data received from a vehicle sensor, to determine an adjusted vehicle position based on the identified point and the vehicle position data.

The identified point may be a reference point of an object described in the received object data.

The instructions may further comprise instructions to determine the volume based at least in part on vehicle dimensions.

A bottom of the volume may be centered at a projection of a vehicle reference point on a ground surface determined based on the vehicle position data.

The instructions may further comprise instructions to operate the vehicle based on the adjusted vehicle position.

The instructions may further comprise instructions to filter the vehicle position data by applying a first Kalman filter to the vehicle position data, and to filter position data of the identified point by applying a second Kalman filter to the position data of the point.

The instructions may further comprise instructions to operate the vehicle based on the vehicle position data upon determining that the object from the external node lacks a point within the volume.

The instructions may further comprise instructions to identify the point within the volume only upon determining, based on the received object data, that the identified point is a reference point of an object with a type that matches a vehicle type.

The instructions may further comprise instructions to identify the point within the volume only upon determining, based on the received object data, that the identified point is a reference point of an object with dimensions that matches the dimensions of the vehicle that received the object data.

The instructions may further comprise instructions to determine the volume with a bottom on a ground surface with predetermined dimensions centered a projection vehicle position on a ground surface, and upon identifying an object, from the broadcast data, with a reference point that is within the determined volume, to determine the adjusted vehicle position based in part on location coordinates of the object reference point.

The position data may include at least a lateral coordinate, a longitudinal coordinate, an orientation, a lateral speed, a longitudinal speed, and a rotational speed of the vehicle.

The object data may further include at least a lateral coordinate, a longitudinal coordinate, an orientation, a lateral speed, a longitudinal speed, and a rotational speed of an object.

The object data may include at least one of location coordinates, an orientation, an object type, a speed, a rotational speed, a shape, and dimensions of the object.

Further disclosed herein is a computer that comprises a processor and a memory. The memory stores instructions executable by the processor to extract, from an object-data set received via an external node, extra-positional data that correlates with vehicle position data, independently filter the extra-positional and vehicle position data, and then fuse the filtered extra-positional and vehicle position data to improve vehicle localization.

The instructions may further comprise instructions to operate the vehicle based on the fused filtered extra-positional and vehicle position data.

The instructions may further comprise instructions to filter the vehicle position data by applying a first Kalman filter to the vehicle position data, and to filter the extra-positional data that correlates with vehicle position data by applying a second Kalman filter to the extra-positional data that correlates with the vehicle position data.

The instructions may further comprise to operate a vehicle based on the vehicle position data upon determining that the extra-positional data from the external node correlates with the vehicle position data.

The extra-positional data may include at least one of location coordinates, an orientation, an object type, a speed, a rotational speed, a shape, and dimensions of a vehicle.

The instructions may further comprise instructions to extract the extra-positional data that correlates with the vehicle position upon determining, based on the received object-data set, that the extra-positional data describes an object with dimensions that match the dimensions of the vehicle that received the object-data set.

Further disclosed herein is a system comprising means for receiving broadcast object data, means for determining a first position of a vehicle based on vehicle sensor data, means for identifying a second position of the vehicle based on broadcast object data received from a remote computer and the first position, and means for determining a fused position of the vehicle based on a filtered first position and a filtered second position of the vehicle.

Further disclosed is a computing device programmed to execute any of the above method steps.

Yet further disclosed is a computer program product, comprising a computer readable medium storing instructions executable by a computer processor, to execute any of the above method steps.

System Elements

A vehicle may include a location sensor, among others, that provides data including a vehicle location (or position) and/or a vehicle orientation. A vehicle computer may operate the vehicle by actuating vehicle propulsion, braking, and/or steering actuators based at least in part on the data received from the vehicle location sensor. The location and/or orientation data received from a vehicle sensor may be inaccurate, which may result in problems with vehicle navigation, e.g., increasing a risk of a collision with another object.

Herein, systems and methods are disclosed to improve an accuracy of a vehicle location sensor by fusing (i) data received from the vehicle location sensor and (ii) data received from an external object detection sensor, e.g., a stationary sensor such as a Lidar, camera, radar, etc. mounted to a pole at a side of a road having a field-of-view that includes the vehicle, a sensor mounted to another vehicle, bicycle, drone, etc. According to one technique described herein, a vehicle computer can be programmed to: receive object data (or object data set including object data pertaining to one or more objects) from an external node, e.g. the stationary sensor, a sensor of a different vehicle, etc.; receive vehicle position data from an onboard vehicle sensor; using the vehicle position data and map data, correlate a 3D volume of the vehicle relative to the map data; correlate the object data to the 3D map data; identify a point, in the received object data, that is within the volume; and determine an adjusted vehicle position based on the identified point and the vehicle position data. In the present context, an external node is any wireless node outside of the vehicle 101, e.g., the sensor 165, a remote computer, another vehicle, etc.

Figure 1B:
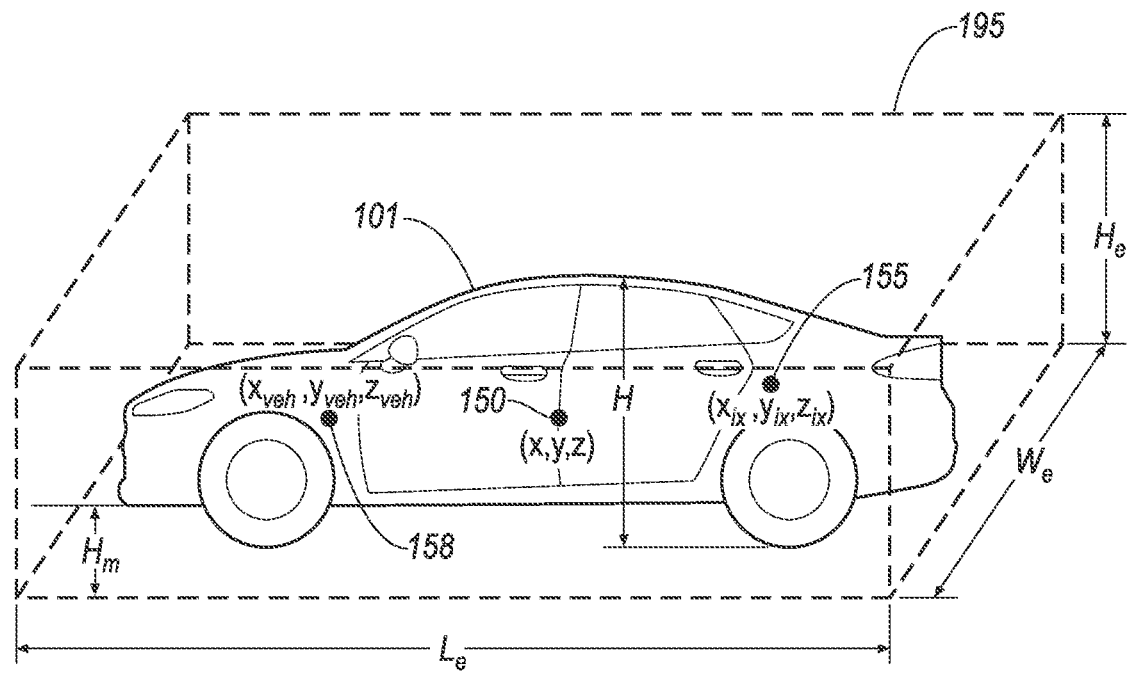
FIG. 1B is a side view of the vehicle of FIG. 1A.

FIGS. 1A-1B illustrate an example system 100 including (i) a vehicle 101 having a computer 110, actuator(s) 120, sensor(s) 130, a wireless interface 140, and a reference point 150, located in a geographical area 160, and (ii) at least one sensor 165 (which in at least one example is fixed to infrastructure), having a computer 170 and a communication interface 175. A description of vehicle 101 components and how an example vehicle 101 operates follows an exemplary description of the sensor 165 and multiple example methods of operation of the sensor 165. As will be apparent from the description that follows, sensor 165 can communicate with more than one vehicle (other vehicles not shown), and in at least one example, multiple sensors can be used. In these examples, each sensor may be identical; thus, only one sensor (sensor 165) is shown.

A geographic area 160 (or area 160), in the present context, means a two-dimensional (2D) area on the surface of the earth. Boundaries or edges of an area 160 may be defined by global positioning system (GPS) coordinates, e.g., as vertices of a triangular or rectangular area 160, a center of a circular area 160, etc. An area 160 may have any dimensions and/or shape, e.g., rectangular, oval, circular, non-geometrical shape, etc. An area 160 may include a section of a road, an intersection, etc. An area 160 may be defined by a detection range of the sensor 165, i.e., locations within a predetermined distance, e.g., 200 meters (m), from the sensor 165. In addition to vehicle 101, other objects (not shown) such as other vehicles, pedestrians, bicycles, etc. may be present in the area 160.

With continued reference to FIG. 1A, the system 100 may include one or more sensor(s) 165 positioned, e.g., at a side of a road, an intersection, etc., and/or mounted to any non-moving object such as a building, a pole, etc. A detection range of a sensor 165, in the present context, is a predefined distance from the sensor 165 location that also includes an unobstructed field-of-view of the sensor 165—e.g., a range and line-of-sight by which vehicle 101 and/or other objects can be detected. In other examples, a Lidar sensor 165 may be located on any suitable moving or non-moving object.

The computer 170 of sensor 165 may include a processor and a memory storing instructions executable by the processor. The computer 170 memory includes one or more forms of computer-readable media, and stores instructions executable by the processor of the sensor 165 for performing various operations, including as disclosed herein.

The sensor 165 includes an object detection sensor and/or a depth-detection sensor. For example, the sensor 165 may include one or more of a Lidar sensor, camera sensor, radar sensor, etc. The sensor 165 may be stationary, e.g., mounted to a pole (see FIG. 1A) or moving, e.g., mounted to a second vehicle and having a field-of-view including an area exterior to the respective second vehicle. For example, a Lidar sensor 165 may sweep the example area 160 by transmitting laser beams, and receiving reflections of the transmitted Lidar beams from outer surfaces of objects such as the vehicle 101, etc., and/or a ground surface (e.g., point-cloud data). Using the point-cloud data, the Lidar sensor 165 computer 170 may be programmed to generate Lidar object data based on the received reflections. Table 1 illustrates exemplary information that may comprise object data. As used herein, object data means data describing attributes such as location, dimensions, etc., of physical objects in a 3D region, e.g., a volume above the area 160. The object data may include location coordinates $x_{ix}$, $y_{ix}$, $z_{ix}$ of points on outer surfaces of objects, e.g., the vehicle 101, which cause a reflection of the emitted light beams. In other words, the object data may include point cloud data, i.e., 3D location coordinates $x_{ix}$, $y_{ix}$, $z_{ix}$ of a plurality of points within the field-of-view of the Lidar sensor 165.

TABLE 1

| Datum | Description |
| --- | --- |
| Object identifier | A numeric value, e.g., 1, 2, 3, etc. |
| Object type | Vehicle, bicycle, pedestrian, building, pole, sidewalk, road surface, etc. |
| Location | 2D or 3D location coordinates $x_{ix}$, $y_{ix}$, $z_{ix}$ of an object reference point, e.g., center point. |
| Dimensions | physical dimensions, e.g., length L, width W, height H. |
| Shape | physical shapes, e.g., round, rectangular, etc. |
| Orientation | The orientation $\theta_{ix}$ is a direction of movement and/or a direction of object (relative to an X or Y axis on the ground surface) based on a shape of the object, e.g., longitudinal direction of a vehicle. |
| Speed | Including longitudinal and/or lateral speed $\dot{x}_{ix}$, $\dot{y}_{ix}$, and/or scalar speed of object. |
| Rotational speed | A derivative $\dot{\theta}_{ix}$ of the orientation $\theta_{ix}$ of the object over time. |

Object data may include data pertaining to multiple objects, e.g., n objects within the field-of-view of the sensor 165. In one example shown in Table 2, data associated with each object $O_1$ to $O_n$ may include object data, as described in Table 1.

TABLE 2

| Object identifier | Data |
| --- | --- |
| $O_1$ | Object Type<br>Location<br>Dimensions<br>etc. |
| ... | ... |
| $O_{11}$ | Object Type<br>Location<br>Dimensions<br>etc ... |

The location data may specify (two-dimensional) 2D location coordinates $x_{ix}$, $y_{ix}$ of an object with respect to a 2D coordinate system, e.g., X, Y, axes 180, 185, or a 3D (three-dimensional) location coordinates $x_{ix}$, $y_{ix}$, $z_{ix}$ of an object with respect to a 3D coordinate system, e.g., X, Y, Z axes 180, 185, 190, and/or an orientation $\theta_{ix}$ of the object. The location coordinates included in object data specify coordinates of a point of the object. As used herein, with respect to example Table 1, an object point may be a reference point 155, e.g., a center-point, of the object identified based on dimensions, shape, etc. of the object. In yet another example in the context of point cloud data, object data may specify location coordinates of point from which a reflection is received, e.g., any point on an outer surface of the object.

An orientation $\theta_{ix}$, in the present context, is a direction or pose of an object on the ground plain relative to an X-axis or a Y-axis (e.g., by way of example in the description that follows, orientation $\theta_{ix}$ is described relative to the X-axis 180). Thus, the orientation $\theta_{ix}$ may be a yaw angle on the ground plain. For example, an orientation $\theta_{ix}$ of the vehicle 101 may be specified by an angle between the X axis 180 and the vehicle's longitudinal axis. In the present context, 2D location coordinates $x_{ix}$, $y_{ix}$ specify location coordinates of a projection of the point 155 on the ground surface. The X, Y, Z axes 180, 185, 190 may be GPS coordinates system. Thus, in one example, the computer 170 may be programmed to determine the coordinates $x_{ix}$, $y_{ix}$ of an object relative to the GPS coordinate system based on stored location coordinates of the sensor 165 and data received from the sensor 165.

In another example, the Lidar object data may include dimensions, type, location, orientation, shape, etc., of one or more detected objects. For example, the sensor 165 processor may be programmed to classify an object as a car, truck, bicycle, pedestrian, building, vegetation, etc. using techniques such as semantic segmentation or the like. Thus, location coordinates $x_{ix}$, $y_{ix}$ may specify location coordinates of, e.g., a projection of a reference point 155 such as a center point (based on detected dimensions, e.g., length L, width W, height H, and/or shape of the object in the sensor 165) on the ground surface. The computer 170 may calculate a center point 155 for the detected object and determine the location coordinates of the calculated center point 155 in the broadcast object data. Additionally, the object data may include elevation coordinate $z_{ix}$, as discussed above.

Additionally, or alternatively, multiple sensors 165 may collectively cover an area 160. In one example, multiple sensors 165 may be placed at a location, e.g., mounted to a pole, each providing a field-of-view in a specified direction. Additionally, or alternatively, multiple sensors 165 may be located in an area 160, e.g., mounted to multipole poles, buildings, etc.

Sensor 165 may communicate via communication interface 175 to vehicle 101 wireless interface 140, a remote computer, other sensors (e.g., mounted elsewhere to infrastructure), etc. The communication interface 175 may provide wired and/or wireless communication. The sensor 165 may be programmed to broadcast object data via the communication interface 175.

A wireless communication network (not shown), which may include a Vehicle-to-Vehicle (V-to-V) and/or a Vehicle-to-Infrastructure (V-to-I) communication network, includes one or more structures, e.g., wireless chip, transceiver, etc., by which the sensor 165, remote computer(s), vehicles (e.g., such as vehicle 101), etc., may communicate with one another, including any desired combination of wireless (e.g., cellular, wireless, satellite, microwave and radio frequency) communication mechanisms and any desired network topology (or topologies when a plurality of communication mechanisms are utilized). Exemplary V-to-V or V-to-I communication networks include cellular, Bluetooth, IEEE 802.11, dedicated short range communications (DSRC), and/or wide area networks (WAN), including the Internet, providing data communication services. For example, the sensor 165 may transmit data wirelessly via the wireless communication interface 175 to a vehicle 101. The vehicle 101 computer 110 may be programmed to receive data via the vehicle 101 wireless interface 140.

As discussed above, example vehicle 101 may include various components such the computer 110, actuator(s) 120, sensors 130, the wireless interface 140, and/or other components such as discussed herein below. The vehicle 101 may have a reference point 150, e.g., which may be an intersection of the vehicle's longitudinal and lateral axes (the axes can define respective longitudinal and lateral center lines of the vehicle 101 so that the reference point 150 may be referred to as a vehicle 101 center point). Dimensions of the vehicle 101 may be specified with a length L, a width W, a height H (see FIG. 1B).

The computer 110 includes a processor and a memory. The memory includes one or more forms of computer-readable media, and stores instructions executable by the computer 110 for performing various operations, including as disclosed herein.

The computer 110 may operate the vehicle 101 in an autonomous, semi-autonomous, or non-autonomous mode. For purposes of this disclosure, an autonomous mode is defined as one in which each of vehicle 101 propulsion, braking, and steering are controlled by the computer 110; in a semi-autonomous mode the computer 110 controls one or two of vehicle 101 propulsion, braking, and steering; in a non-autonomous mode, a human operator controls vehicle propulsion, braking, and steering.

The computer 110 may include programming to operate one or more of vehicle brakes, propulsion (e.g., control of acceleration in the vehicle 101 by controlling one or more of an internal combustion engine, electric motor, hybrid engine, etc.), steering, climate control, interior and/or exterior lights, etc., as well as to determine whether and when the computer 110, as opposed to a human operator, is to control such operations.

The computer 110 may include or be communicatively coupled to, e.g., via a vehicle communications bus (not shown) as described further below, more than one processor, e.g., controllers or the like included in the vehicle for monitoring and/or controlling various vehicle controllers, e.g., a powertrain controller, a brake controller, a steering controller, etc. The computer 110 is generally arranged for communications on a vehicle communication network such as a bus in the vehicle such as a controller area network (CAN) or the like. Via the vehicle network, the computer 110 may transmit messages to various devices in the vehicle 101 and/or receive messages from the sensors 130, actuators 120, etc.

The vehicle 101 actuators 120 may be implemented via circuits, chips, or other electronic components that can actuate various vehicle subsystems in accordance with appropriate control signals as is known. The actuators 120 may be used to control braking, acceleration, and steering of the vehicle 101. As an example, the vehicle 101 computer 110 may output control instructions to control the actuators 120.

The vehicle 101 may include one or more position sensor(s) 130, providing data encompassing location coordinates $x_{veh}$, $y_{veh}$ of a reference point 158 and/or an orientation $\theta_{veh}$ of the vehicle 101. As discussed above, due to, e.g., an inaccuracy of the vehicle 101 sensor 130, the position sensor 130 may identify the reference point 158 with the location coordinates $x_{veh}$, $y_{veh}$ instead of the real reference point 150. The 2D location coordinates herein specify a projection of a vehicle 101 reference point 158 on the ground surface. An elevation coordinate $z_{veh}$ can be determined based on the height H of the vehicle 101, e.g., stored in a computer 110 memory. In one example, the elevation $z_{veh}$ coordinate of a center point 150 may be half of the height H. The position sensor 130 may include a GPS sensor 130, a wireless sensor measuring time-of-flight (ToF), a camera sensor, a radar sensor, and/or a Lidar sensor. The computer 110 may be programmed to determine, based on data received from the sensor(s) 130, the location coordinates $x_{veh}$, $y_{veh}$, $z_{veh}$ and/or an orientation $\theta_{veh}$ relative to a Cartesian coordinates system with the X, Y, Z axes 180, 185, 190, e.g., GPS coordinate system.

In one example, the computer 110 may be programmed to determine location coordinates $x_{veh}$, $y_{veh}$ and/or an orientation $\theta_{veh}$ of the vehicle 101 based on data received from the depth detection sensor 130 and map data, e.g., using localization techniques.

With reference to FIG. 1A, location coordinates x, y show actual location coordinates of the vehicle 101 reference point 150. An orientation θ is an actual orientation of the vehicle 101. However, as shown in FIG. 1A, the location coordinates $x_{veh}$, $y_{veh}$ and/or an orientation $\theta_{veh}$ determined based on vehicle sensor 130 data may differ from the actual location coordinates x, y and/or the actual orientation θ of the vehicle 101, e.g., due to an inaccuracy of the position sensor 130.

In a non-limiting example, the computer 110 can be programmed to receive object data from an external node, and, upon identifying a point 155, in the received object data, that is within a volume 195 defined using vehicle 101 position data received from a vehicle 101 sensor 130, to determine an adjusted vehicle position based on the identified point 155 and the vehicle 101 position.

In the present context, the point 155 is a point in and/or on the vehicle 101 specified in the object data received from the sensor 165. For example, the point 155 may be a reference point 155 specified in the received object data (see Table 1). In another example, the point 155 may be a point on an exterior surface of the vehicle 101 included in the point cloud data. With reference to FIG. 1A, the data included in the object data pertaining to the point 155 include the location coordinates $x_{ix}$, $y_{ix}$ and/or the orientation $\theta_{ix}$.

In the present context, the vehicle 101 position received from a vehicle 101 sensor 130 means location coordinates $x_{veh}$, $y_{veh}$ (or 3D location coordinates $x_{veh}$, $y_{veh}$, $z_{veh}$, as discussed above) and/or the orientation $\theta_{veh}$. As shown in FIG. 1A, location coordinates $x_{veh}$, $y_{veh}$ and/or the orientation $\theta_{veh}$ may differ from the actual location coordinates x, y of the reference point 150 and/or the actual orientation θ of the vehicle 101.

The volume 195 is defined using the location data received from the vehicle 101 sensor 130, e.g., location coordinates $x_{veh}$, $y_{veh}$, and optionally the elevation coordinate $z_{veh}$ and/or the vehicle height H. The volume 195 may be a rectangular solid shaped volume having an estimated length $L_e$, an estimated width $W_e$, and an estimated height $H_e$ (see FIG. 1B). A bottom of the volume 195 may be centered at the location coordinates $x_{veh}$, $y_{veh}$ and directed in a same direction as of the direction of the vehicle 101 (based on received data from the sensors 130). The estimated height $H_e$ may be specified based on a vehicle 101 height, e.g., 2 meters (m). The computer 110 may be programmed to estimate the length $L_e$ and width $W_e$ of the volume 195 based on the equations (1)-(2). In one example, parameters a, b each may be set to a value of 2, e.g., to account for inaccuracies of each of the sensors 130, 165. In other words, an adjustment of parameters a, b provides a possibility of shrinking or enlarging the volume 195 to determine whether to ignore or accept received object data as matching data to the vehicle 101. Additionally, or alternatively, the computer 110 may be programmed to estimate the dimensions $L_e$, $W_e$ of the volume 195 based on filtered sensor 130 data, as discussed below with reference to the FIGS. 2A-2B.

$$L_e = a \cdot L \tag{1}$$

$$W_e = b \cdot W \tag{2}$$

Figure 2A:
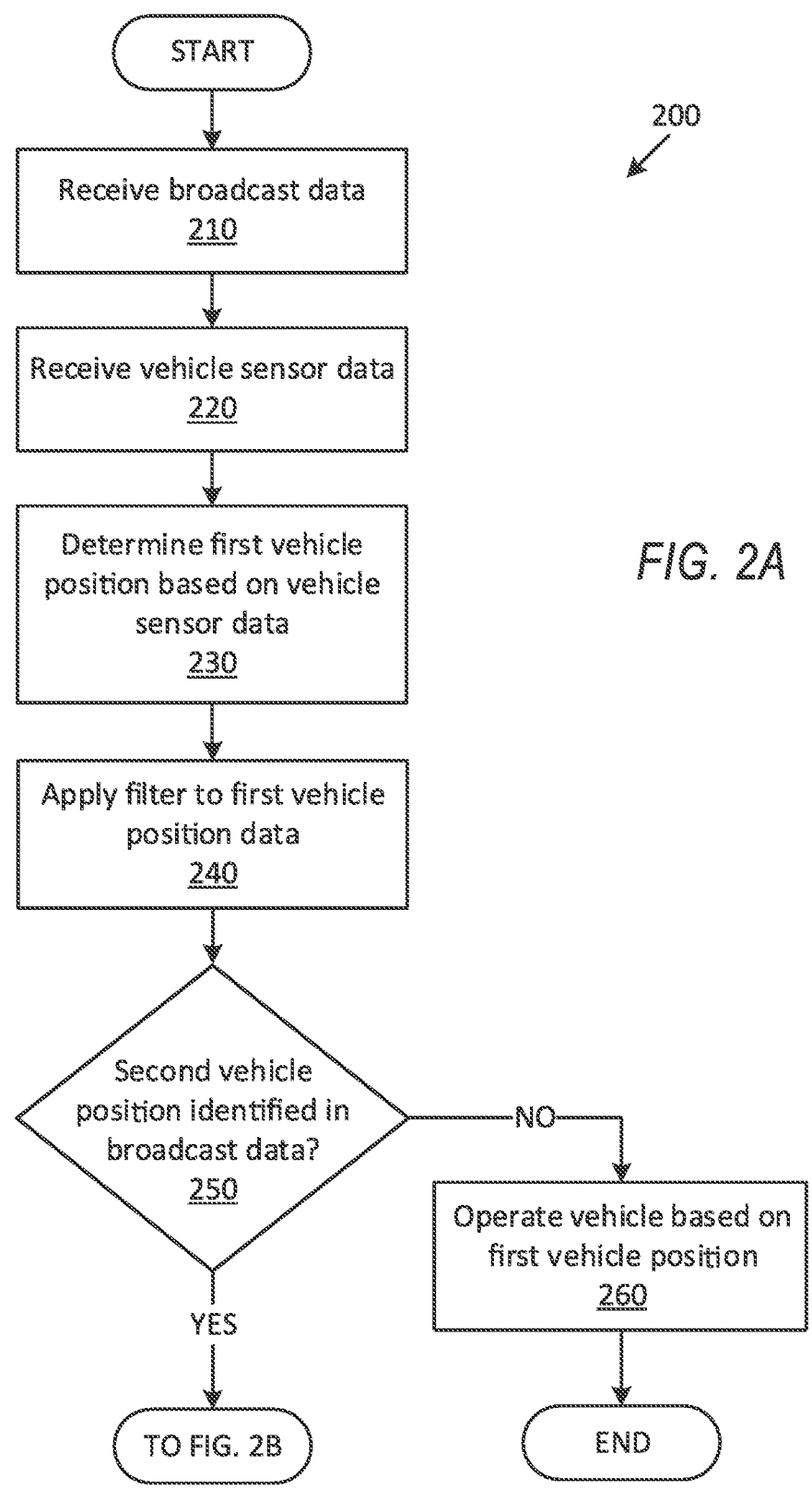
FIGS. 2A-2B show a flowchart of an exemplary process for operating the vehicle.
Figure 2B:
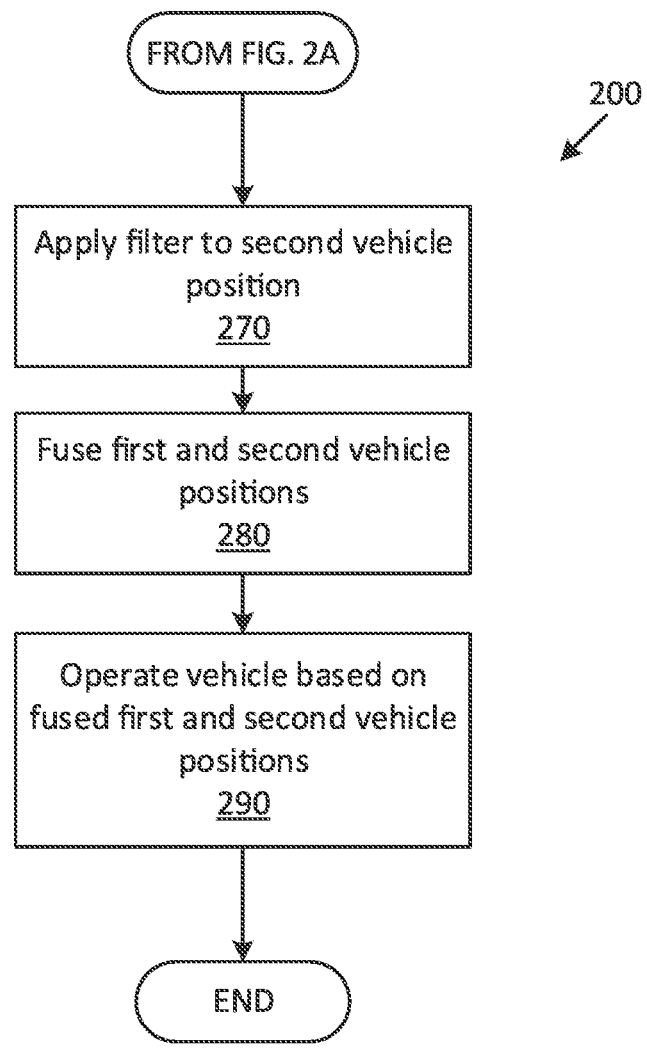

FIGS. 2A-2B illustrates a flowchart of an example process 200 for operating the vehicle 101. In one example, the computer 110 may be programmed to execute blocks of the process 200.

The process 200 begins in a block 210, in which the computer 110 receives object data broadcasted by the sensor 165. As discussed above, the broadcasted object data may include point cloud data and/or object data, e.g., Table 1.

Next, in a block 220, the computer 110 receives data from the sensor 130 of the vehicle 101. The computer 110 may be programmed to receive data from position sensor 130, depth detection sensor 130, etc.

Next, in a block 230, the computer 110 determines vehicle 101 first position data including 2D location coordinates $x_{veh}$, $y_{veh}$ or 3D location coordinates $x_{veh}$, $y_{veh}$, $z_{veh}$ and/or the orientation $\theta_{veh}$. "First" and "second" are used herein to differentiate between data received from vehicle 101 sensor 130 and data received from an external node such as data from sensor 165. In the present context, first and second position data are sometimes referred to, respectively, as vehicle position data received from the sensor 130 and extra-positional data received from an external node, e.g., from the sensor 165. The computer 110 may be programmed to determine vehicle longitudinal and lateral speed $\dot{x}_{veh}$, $\dot{y}_{veh}$ and/or a rotational speed $\dot{\theta}_{veh}$ based on the location coordinates $x_{veh}$, $y_{veh}$ and/or orientation $\theta_{veh}$.

Next, in a block 240, the computer 110 applies a first filter $F_1$ to the received first vehicle position data. The data received from the sensor 130 may include noise. A filter is any suitable linear-quadratic state estimation filter. Non-limiting examples include a Kalman filter, an extended Kalman filter, an unscented Kalman filter, a recursive Bayesian estimation, a low-pass filter, etc. In one example, with reference to equations (3) and (4), the computer 110 may be programmed to generate the filtered first position $X_{veh_f}$ by applying a first Kalman filter $F_1$ to the first position $X_{veh}$ of the vehicle 101. With respect to equation (3), the first position $X_{veh}$ of the vehicle 101 may additionally include the longitudinal and lateral speed $\dot{x}_{veh}$, $\dot{y}_{veh}$ and/or a rotational speed $\dot{\theta}_{veh}$.

$$X_{veh} = [x_{veh}\ y_{veh}\ \theta_{veh}] \tag{3}$$

$$X_{veh_f} = F_1(X_{veh}) \tag{4}$$

The first Kalman filter $F_1$ may be specified based on attributes, e.g., a distribution of a noise in sensor data, a motion model of the vehicle 101, etc. A Kalman filter $F_1$ typically includes a covariance matrix, e.g., the first covariance matrix $Q_{veh}$ for filtering the sensor 130 data received from the vehicle 101 position sensor 130. A covariance is a measure of a joint variability of multiple random variables, e.g., the location coordinates $x_{veh}$, $y_{veh}$. The covariance matrix $Q_{veh}$ may be determined based at least in part on the sensor 130 technical characteristics and/or via empirical methods, e.g., collecting data from the sensor 130 and analyzing the collected data with reference to ground truth data to determine the covariance matrix $Q_{veh}$.

Additionally, or alternatively, the computer 110 may be programmed to filter the vehicle 101 first position $X_{veh}$ by applying a low-pass filter $F_1$ to the first position $X_{veh}$. A low-pass filter is a filter that passes signals with a frequency lower than a specified cutoff frequency and attenuates (or weakens) signals with frequencies higher than the cutoff frequency. In one example, the cutoff frequency of the filter $F_1$ may be specified based on a frequency, e.g., 100 Hz, of noise included in the data received from the sensor 130. For example, the cut off frequency may be a frequency, e.g., 80 Hz that is less than the specified noise frequency.

Next, in a decision block 250, the computer 110 determines whether a second vehicle position (or extra-positional data) is identified in the broadcast data. The computer 110 may be programmed to extract, from the object-data set received via the external node, e.g., the sensor 165, extra-positional data $X_{ix}$ that correlates with vehicle position data $X_{veh}$. For example, with reference to equation (5), the computer 110 may be programmed to determine that the broadcast data includes a second position data for the vehicle 101 upon identifying, in the broadcast data, an object with a reference point 155 with location coordinates $X_{ix}$ within the volume 195 (i.e., upon determining that a reference point 155 such as center-point of the object is within the specified volume 195). Thus, the computer 110 may be programmed to determine the second location coordinates $X_{ix}$ as the second position of the vehicle 101 (which will be fused later with the first position to determine an adjusted position). With respect to equation (5), the second vehicle position $X_{ix}$ may additionally include the longitudinal and lateral speed $\dot{x}_{ix}$, $\dot{y}_{ix}$ and/or the rotational speed $\dot{\theta}_{ix}$.

$$X_{ix}=[x_{ix}\ y_{ix}\ \theta_{ix}] \quad (5)$$

The computer 110 may be further programmed to determine the identified object location coordinates $X_{ix}$ as the second position of the vehicle 101 upon determining at least one of (i) a type, e.g., car, truck, etc., of the identified object in the broadcast data matches the type of the vehicle 101, e.g., stored in a computer 110 memory, and (ii) dimensions of the identified object in the broadcast data match the dimensions of the vehicle 101. In the present context, "matching dimensions" may mean dimensions that have a difference less than a maximum difference threshold, e.g., 10%. Additionally, or alternatively, with reference to equation (6), the computer 110 may be programmed to determine the identified object location coordinates $X_{ix}$ as the second position of the vehicle 101 upon determining that a difference between the orientation $\theta_{ix}$ of the identified object and the orientation $\theta_{veh}$ of the vehicle 101 determined based on vehicle 101 sensor 130 data is less than a threshold $\theta_{th}$, e.g., 30 degrees.

$$|\theta_{ix}-\theta_{veh}|<\theta_{th} \quad (6)$$

As discussed above, the broadcast object data may include a point cloud and/or object data such as shown in Table 1. Thus, in the present context, the point 155 may be (i) a point in the point cloud data, e.g., any point on an outer surface of the vehicle 101, i.e., any point within the volume 195 with an elevation, e.g., 30 centimeter (cm), above the ground surface (in order to exclude Lidar reflections from the ground surface), and/or (ii) a reference point 155 of an object included in a list of objects, e.g., as specified in Table 1.

If the computer 110 determines that the point 155 location coordinates $x_{ix}$, $y_{ix}$, $z_{ix}$ is within the volume 195 or location coordinates $x_{ix}$, $y_{ix}$ of a projection of the point 155 on the ground surface is within a bottom surface (a 2D area on the ground surface) of the volume 195, then the process 200 proceeds to a block 270 (see FIG. 2B); otherwise the process 200 proceeds to a block 260.

In the block 260, the computer 110 operates the vehicle 101 based at least in part on the first vehicle 101 position determined based on vehicle 101 sensor 130 data. For example, the computer 110 may be programmed to actuate vehicle 101 propulsion, steering, and/or braking actuator(s) 120 based on a specified destination, the first position data determined based on GPS sensor 130 data, etc. In other words, when no point 155 within the volume 195 is identified, the computer 110 may operate the vehicle 101 without fusing the sensor 130 data with any data from an external node. Following the block 260, the process 200 ends, or returns to a block 210, although not shown in FIG. 2A.

Now turning to FIG. 2B, in the block 270, the computer 110 applies a second filter $F_2$ to the position data of the identified point 155 (i.e., the second vehicle position data). For example, with reference to equation (7), the computer 110 may be programmed to generate a filtered second position by applying a second Kalman filter $F_2$ to the second position $X_{ix}$ of the vehicle 101. A sensor 165 covariance matrix $Q_{ix}$ may specify covariance of broadcast data received from the sensor 165. As discussed above, a covariance matrix $Q_{ix}$ may be determined based on the technical characteristics of the sensor 165 and/or via empirical methods. In one example, the computer 110 may be programmed to receive the covariance matrix $Q_{ix}$ and/or one or more technical characteristics of the second Kalman filter $F_2$ from the sensor 165 computer 170 via the wireless communication network.

$$X_{ix_f}=F_2(X_{ix}) \quad (7)$$

Additionally, or alternatively, the computer 110 may be programmed to filter the second position data $X_{ix}$ by applying a low-pass filter $F_2$ to the second position $X_{ix}$. In one example, the cut off frequency of the filter $F_2$ may be specified based on a frequency, e.g., 100 Hz, of noise included in the broadcast data received from the sensor 165. For example, the cut off frequency may be a frequency, e.g., 80 Hz, less than the specified noise frequency.

Next, in a block 280, the computer 110 fuses the filtered second position $X_{ix_f}$ (or filtered extra-positional data) and the filtered vehicle position data $X_{veh_f}$ to improve vehicle 101 localization. In the present context, "to fuse" means to merge two sets of position-related data into a single set for the purpose of improving vehicle localization. A result of fusing the vehicle position data and extra-positional data from the external node is herein referred to as an adjusted position. The computer 110 may be programmed to determine an adjusted vehicle position $X_a$ including adjusted location coordinates $x_a$, $y_a$ and/or an adjusted orientation $\theta_a$ based on the filtered first and second vehicle position data $X_{ix_f}$ and $X_{veh_f}$ using various data fusion techniques.

In one example, the computer 110 may be programmed based on equation (8) to fuse the filtered first and second position data. FIG. 1A shows adjusted vehicle position $x_a$, $y_a$ and the adjusted orientation $\theta_a$.

$$X_a = \frac{\frac{X_{veh}}{Q_{veh}} + \frac{X_{ix}}{Q_{ix}}}{\frac{1}{Q_{veh}} + \frac{1}{Q_{ix}}} \qquad (8)$$

Next, in a block 290, the computer 110 operates the vehicle 101 based on the fused first and second position data $X_{xi_f}$ and $X_{veh_f}$. For example, the computer 110 may be programmed to operate the vehicle 101 based on the adjusted vehicle 101 position $X_a$. The computer 110 may be programmed to perform a vehicle function based on determining the adjusted vehicle 101 position data $X_a$. Non-limiting examples of performing a vehicle function include to actuate at least one of the vehicle 101 propulsion, steering, and/or braking actuators 120. Following the block 290, the process 200 ends, or alternatively, returns to the block 210, although not shown in FIGS. 2A-2B.

With reference to process 200, (i) means for receiving broadcast object data may include a wireless interface 140 of the vehicle 101 configured to communicate with an external node, e.g., the wireless communication interface 175 of the sensor 165; (ii) means for determining a first position of a vehicle 101 may be position sensor 130 or any other type of sensor based on which the computer 110 may localize the vehicle 101, e.g., localizing based on lidar sensor 130 data; (iii) means for identifying a second position of the vehicle 101 and means for determining a fused position of the vehicle 101 may include the vehicle 101 computer 110 programmed to execute blocks of the process 200.

Thus, there has been described a system for improving vehicle localization that comprises a vehicle computer and a vehicle position sensor. According to one example, the computer is programmed to execute a process to detect improve vehicle position data accuracy using object data received from an external node. The vehicle computer may then operate the vehicle based on data improved vehicle position data Computing devices as discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A computer, comprising a processor and a memory, the memory storing instructions executable by the processor to:
   receive object data in a vehicle via wireless communications from an object-detection sensor that is external to the vehicle;
   upon identifying a point in the received object data that is within a volume defined using vehicle position data received from a vehicle sensor, determine an adjusted vehicle position by fusing the identified point and the vehicle position data; and
   operate the vehicle based on the adjusted vehicle position.

2. The computer of claim 1, wherein the identified point is a reference point of an object described in the received object data.

3. The computer of claim 1, wherein the instructions further comprise to determine the volume based at least in part on vehicle dimensions.

4. The computer of claim 1, wherein a bottom of the volume is centered at a projection of a vehicle reference point on a ground surface determined based on the vehicle position data.

5. The computer of claim 1, wherein the instructions further comprise to operate the vehicle based on the adjusted vehicle position.

6. The computer of claim 1, wherein the instructions further comprise to:
   filter the vehicle position data by applying a first Kalman filter to the vehicle position data; and
   filter position data of the identified point by applying a second Kalman filter to the position data of the point.

7. The computer of claim 1, wherein the instructions further comprise to operate the vehicle based on the vehicle position data upon determining that the object from the received object data lacks a point within the volume.

8. The computer of claim 1, wherein the instructions further comprise to identify the point within the volume only upon determining, based on the received object data, that the identified point is a reference point of an object with a type that matches a vehicle type.

9. The computer of claim 1, wherein the instructions further comprise to identify the point within the volume only upon determining, based on the received object data, that the identified point is a reference point of an object with dimensions that match the dimensions of the vehicle that received the object data.

10. The computer of claim 1, wherein the instructions further comprise to:
determine the volume with a bottom on a ground surface with predetermined dimensions centered at a projection vehicle position on a ground surface; and
upon identifying an object, from the object data, with a reference point that is within the determined volume, determine the adjusted vehicle position based in part on location coordinates of the object reference point.

11. The computer of claim 1, wherein the position data includes at least a lateral coordinate, a longitudinal coordinate, an orientation, a lateral speed, a longitudinal speed, and a rotational speed of the vehicle.

12. The computer of claim 1, wherein the object data further include at least a lateral coordinate, a longitudinal coordinate, an orientation, a lateral speed, a longitudinal speed, and a rotational speed of an object.

13. The computer of claim 1, wherein the object data include at least one of location coordinates, an orientation, an object type, a speed, a rotational speed, a shape, and dimensions of the object.

14. A computer, comprising a processor and a memory, the memory storing instructions executable by the processor to:
extract, from an object-data set received in a vehicle via wireless communications from an object-detection sensor external to the vehicle, extra-positional data that correlates with vehicle position data;
independently filter the extra-positional and vehicle position data;
fuse the filtered extra-positional and vehicle position data to improve vehicle localization; and then
operate the vehicle based on the fused filtered extra-positional and vehicle position data.

15. The computer of claim 14, wherein the instructions further comprise to operate the vehicle based on the fused filtered extra-positional and vehicle position data.

16. The computer of claim 14, wherein the instructions further comprise to:
filter the vehicle position data by applying a first Kalman filter to the vehicle position data; and
filter the extra-positional data that correlates with vehicle position data by applying a second Kalman filter to the extra-positional data that correlates with the vehicle position data.

17. The computer of claim 14, wherein the instructions further comprise to operate a vehicle based on the vehicle position data upon determining that the extra-positional data from the object-detection sensor external to the vehicle correlates with the vehicle position data.

18. The computer of claim 14, wherein the extra-positional data include at least one of location coordinates, an orientation, an object type, a speed, a rotational speed, a shape, and dimensions of a vehicle.

19. The computer of claim 14, wherein the instructions further comprise to extract the extra-positional data that correlates with the vehicle position upon determining, based on the received object-data set, that the extra-positional data describes an object with dimensions that match the dimensions of the vehicle that received the object-data set.

20. A computer, comprising a processor and a memory, the memory storing instructions executable by the processor to:
receive, in a vehicle, object data from an external object-detection sensor; and
upon identifying a point, in the received object data, that is within a volume defined using vehicle position data received from a vehicle sensor, determine an adjusted vehicle position by fusing the identified point and the vehicle position data, wherein the point is identified within the volume only upon determining, based on the received object data, that the identified point is a reference point of an object with dimensions that match the dimensions of the vehicle that received the object data.

* * * * *